United States Patent
Jeong et al.

(10) Patent No.: US 8,892,153 B2
(45) Date of Patent: Nov. 18, 2014

(54) METHOD AND APPARATUS FOR UPLINK POWER CONTROL USING RANGING SIGNAL IN WIRELESS COMMUNICATION SYSTEM

(75) Inventors: Su-Ryong Jeong, Yongin-si (KR);
Seung-Hoon Choi, Suwon-si (KR);
Sung-Eun Park, Seoul (KR);
Tae-Young Kim, Seongnam-si (KR);
Hyun-Kyu Yu, Yongin-si (KR);
Chi-Woo Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 399 days.

(21) Appl. No.: 13/290,554

(22) Filed: Nov. 7, 2011

(65) Prior Publication Data

US 2012/0115535 A1 May 10, 2012

(30) Foreign Application Priority Data

Nov. 9, 2010 (KR) .................. 10-2010-0110841

(51) Int. Cl.
*H04W 52/24* (2009.01)
*H04W 52/14* (2009.01)

(52) U.S. Cl.
CPC .......... *H04W 52/146* (2013.01); *H04W 52/242* (2013.01); *H04W 52/244* (2013.01)
USPC .......................................... 455/522

(58) Field of Classification Search
CPC ............ H04W 52/146; H04W 52/242; H04W 52/244
See application file for complete search history.

(56) References Cited

U.S. PATENT DOCUMENTS

2010/0029319 A1* 2/2010 Higuchi et al. ............... 455/522
2011/0098055 A1* 4/2011 Kwon et al. ............... 455/452.2

FOREIGN PATENT DOCUMENTS

WO  WO 2011050850 A1 * 5/2011

* cited by examiner

*Primary Examiner* — Fayyaz Alam
*Assistant Examiner* — Mohammed Rachedine
(74) *Attorney, Agent, or Firm* — Jefferson IP Law, LLP (57) ABSTRACT

A method and an apparatus for uplink power control using a ranging signal in a wireless communication system are provided. The method includes transmitting ranging channel information to a pico Base Station (BS), receiving power control information on a macro terminal from the pico BS, controlling a transmit power strength for the macro terminal based on the power control information, and instructing the macro terminal to control a transmit power to the controlled strength.

20 Claims, 7 Drawing Sheets

METHOD AND APPARATUS FOR UPLINK POWER CONTROL USING RANGING SIGNAL IN WIRELESS COMMUNICATION SYSTEM

PRIORITY

This application claims the benefit under 35 U.S.C. §119 (a) of a Korean patent application filed in the Korean Intellectual Property Office on Nov. 9, 2010 and assigned Serial No. 10-2010-0110841, the entire disclosure of which is hereby incorporated by reference.

BACKGROUND OF THE INVENTION

1. Field of the Invention

The present invention relates to interference reduction in a wireless communication system. More particularly, the present invention relates to a power control method and an apparatus for reducing interference in an uplink signal transmission.

2. Description of the Related Art

Recently, due to an increase in demand for data communication and an increase of various communication services in a wireless communication system, increasing a transmission capacity is needed.

Accordingly, heterogeneous network research is underway. The heterogeneous network is a communication system in which cells having several phases, cell coverage, and characteristics are mingled and managed.

In a case where a macro terminal is at a great distance in a macro cell of a heterogeneous network, the macro terminal suffers an increase of a path loss value for which the macro terminal will have to compensate.

Accordingly, in a case where a pico Base Station (BS) is relatively close to the macro terminal, when the macro terminal transmits an uplink signal at a power level higher than the power level at which a pico terminal of the pico BS transmits an uplink signal, the pico BS has interference from the uplink signal of the macro terminal.

Therefore, there is a need for a method and an apparatus for reducing inter-cell interference dependent on a transmit power of an uplink signal in a heterogeneous network.

SUMMARY OF THE INVENTION

Aspects of the present invention are to address at least the above-mentioned problems and/or disadvantages and to provide at least the advantages described below. Accordingly, an aspect of the present invention is to provide an apparatus and a method for uplink power control using a ranging signal in a wireless communication system.

Another aspect of the present invention is to provide a method and an apparatus for increasing transmission efficiency in a wireless communication system.

A further aspect of the present invention is to provide a method and an apparatus for determining a serving Base Station (BS) for each uplink and downlink in a wireless communication system including a heterogeneous network.

Yet another aspect of the present invention is to provide a power control method and an apparatus for minimizing inter-cell uplink interference in a wireless communication system including a heterogeneous network.

The above aspects are achieved by providing a method and an apparatus for uplink power control using a ranging signal in a wireless communication system.

In accordance with an aspect of the present invention, a method of uplink power control for a terminal in a macro BS of a wireless communication system is provided. The method includes transmitting ranging channel information to a pico BS, receiving power control information on a macro terminal from the pico BS, controlling a transmit power strength for the macro terminal based on the power control information, and instructing the macro terminal to control a transmit power to the controlled strength.

In accordance with another aspect of the present invention, a method of uplink power control for a terminal in a pico BS of a wireless communication system is provided. The method includes receiving ranging channel information from a macro BS, when detecting a ranging signal that a macro terminal transmits to the macro BS, decoding the detected ranging signal and determining a strength of a receive power of the ranging signal, and, if the strength of the receive power is greater than a threshold, determining that there is a possibility that the macro terminal will act as an interference source, and transmitting power control information on the macro terminal to the macro BS to make a request for power control for the macro terminal.

In accordance with another aspect of the present invention, an apparatus of a macro BS for performing uplink power control of a terminal of a wireless communication system is provided. The apparatus includes a backhaul communication unit, a modulator/demodulator (modem), and a controller. The backhaul communication unit communicates with a communication system node. The modem communicates with a terminal. The controller transmits ranging channel information to a pico BS through the backhaul communication unit, receives power control information on a macro terminal from the pico BS, controls a transmit power strength for the macro terminal based on the power control information, and instructs the macro terminal through the modem to control a transmit power to the controlled strength.

In accordance with another aspect of the present invention, an apparatus of a pico BS for performing uplink power control of a terminal of a wireless communication system is provided. The apparatus includes a backhaul communication unit, a modem, and a controller. The backhaul communication unit communicates with a communication system node. The modem communicates with a terminal. The controller receives ranging channel information from a macro BS through the backhaul communication unit and, when detecting, through the modem, a ranging signal that a macro terminal transmits to the macro BS, decodes the detected ranging signal and determines a strength of a receive power of the ranging signal and, if the strength of the receive power is greater than a threshold, determines that there is a possibility that the macro terminal will act as an interference source, and transmits, through the backhaul communication unit, power control information on the macro terminal to the macro BS to make a request for power control for the macro terminal.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention provide a method and an apparatus for uplink power control using a ranging signal in a wireless communication system.

An exemplary embodiment of the present invention proposes an apparatus and a method for uplink power control in a wireless communication system including a heterogeneous network. More particularly, the present invention proposes an uplink power control apparatus and a method for controlling interference between respective cells in a wireless cellular environment in which a pico cell, a femto cell, a macro cell, and the like, coexist.

An exemplary embodiment of the present invention proposes a method and an apparatus for identifying a macro terminal having interference in a pico cell using an uplink ranging signal of the macro terminal, forwarding information on the macro terminal of interference to a macro Base Station (BS), and controlling uplink power of the macro terminal, thereby minimizing a Noise and Interference (NI) in the pico cell.

In the following description, a cell of a wide-area cellular network is called a macro cell, and a cell of a relatively narrow area compared to the existing wide-area cellular network, such as a pico cell and a femto cell, is called a pico cell.

In the following description, the terms macro cell and pico cell may denote a cell of a relatively upper layer (i.e., a wide area) and a cell of a lower layer (i.e., a narrow area) in a heterogeneous network, respectively. The terms "cell" and "BS" are interchangeable in describing exemplary embodiments of the present invention.

FIGS. 1 through 7, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly stated otherwise. A set is defined as a non-empty set including at least one element.

Figure 1:
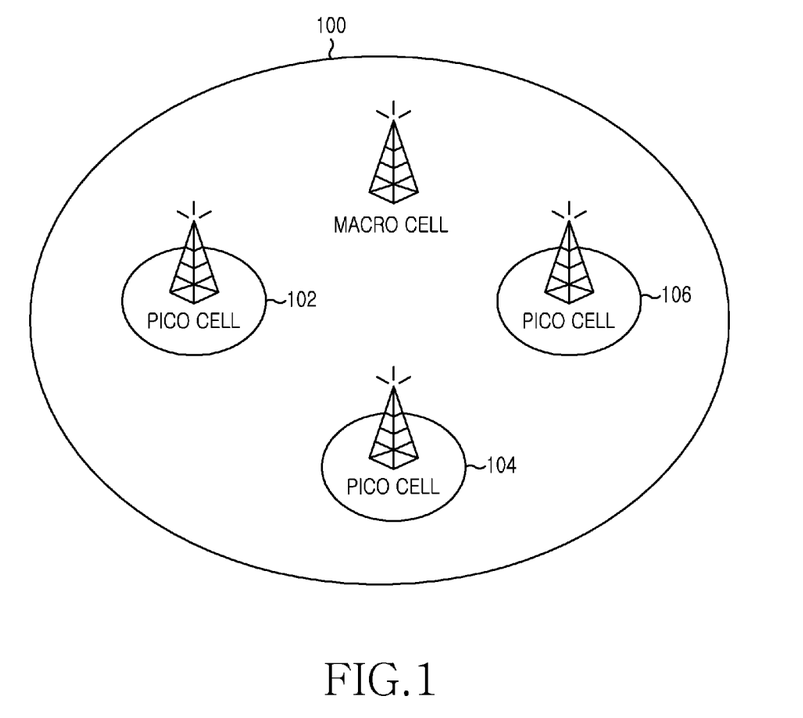
FIG. 1 is a diagram illustrating a heterogeneous network according to an exemplary embodiment of the present invention.

FIG. 1 is a diagram illustrating a heterogeneous network according to an exemplary embodiment of the present invention.

Referring to FIG. 1, a heterogeneous network, in which a plurality of pico cells 102, 104, and 106 are included in addition to a cellular network 100 of an existing macro cell, is provided.

Though not illustrated in FIG. 1, it is also possible that femto cells other than the pico cells are included in the cellular network 100 of the macro cell.

The heterogeneous network may increase not only the entire transmission capacity of a system but also a transmission capacity in an additional cell, such as a pico cell or a femto cell, and provide a supplementary service.

On the other hand, cells included in a heterogeneous network have cell coverage set differently according to each purpose and environment. This is because a transmit power in a corresponding BS is different according to the type of cell.

A cell managing area can be overlapped among cells of different cell coverage, which may result in an inter-cell interference problem.

Inter-cell uplink interference in a heterogeneous network is described below with reference to FIG. 2.

Figure 2:
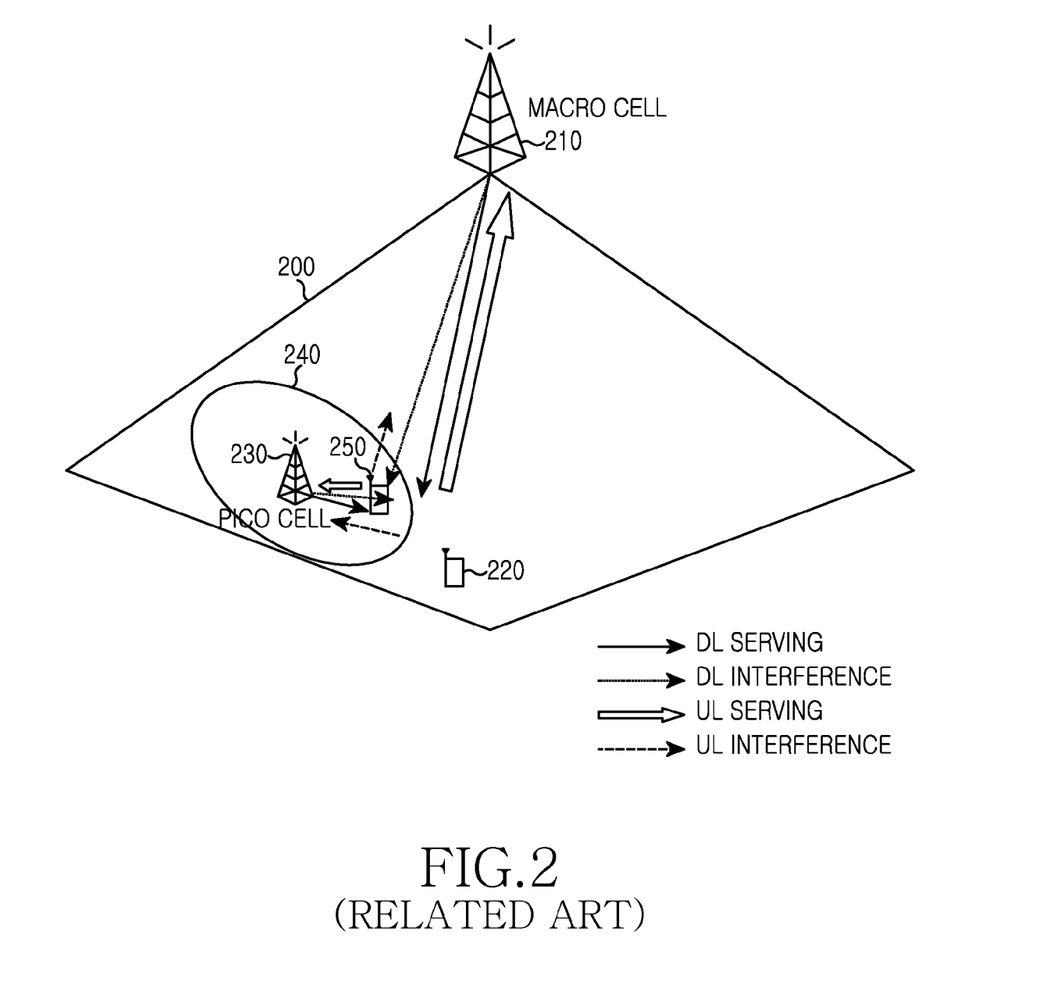
FIG. 2 is a diagram illustrating uplink interference of a macro terminal in a pico cell in a heterogeneous network according to the related art.

FIG. 2 is a diagram illustrating uplink interference of a macro terminal in a pico cell in a heterogeneous network according to the related art.

Referring to FIG. 2, a macro terminal 220 within a macro cell 200 performs communication with a macro BS 210 in a heterogeneous network in which one pico cell 240 is included within the macro cell 200. A description is made for a case that a pico terminal 250 within the pico cell 240 performs communication with a pico BS 230.

The pico terminal 250 suffers interference at the time of uplink signal transmission of the macro terminal 220. That is because the pico terminal 250 is relatively closer to the pico BS 230 than the macro BS 210. This is described using a general power control formula, as follows.

$$P_{TX} = L + NI + SINR_{Target} \quad (1)$$

Equation 1 above is a general uplink power control formula, and is given in a form of compensating for a path Loss (L) and a Noise and Interference (NI) in addition to a target received Signal to Interference and Noise Ratio (SINR).

More particularly, in Equation 1 above, '$P_{TX}$' represents an uplink transmit power, 'L' represents a path loss value, 'NI' represents a noise and interference, and 'SINRtarget' represents a target received SINR.

In a case where the macro terminal 220 is at a great distance in the macro cell 200, the macro terminal 220 suffers an increase of a path loss value for which the macro terminal 220 will have to compensate. Accordingly, the pico BS 230 relatively close to the macro terminal 220 suffers interference from an uplink signal that the macro terminal 220 transmits at a power level higher than the power level at which the pico terminal 250 transmits an uplink signal.

A heterogeneous network can be used to increase a transmission capacity in a wireless communication system. However, because a macro terminal is located relatively closer in a pico cell than a macro cell, an uplink signal of the macro terminal can cause an increase of interference in the pico cell. However, a macro BS is unaware of which macro terminal causes interference in a pico BS.

For the macro BS to identify this, the pico BS has to forward interference information about the entire band or a partial band to the macro BS, or the macro BS has to forward all uplink channel information about the entire band or a partial band to the pico BS. However, this method generates a high overhead.

Accordingly, an exemplary embodiment of the present invention proposes a method for identifying a macro terminal having interference in a pico cell using an uplink ranging signal of the macro terminal, forwarding information on the found macro terminal to a macro BS, and controlling uplink power of the macro terminal, thereby minimizing interference in a pico BS.

Ranging is classified into initial ranging and periodic ranging. At initial access, an initial ranging signal is transmitted by a terminal and, after access, a periodic ranging signal is transmitted by the terminal in order to periodically control an uplink frequency or a time offset.

The transmitted ranging signal includes an inherent code for identifying the terminal itself or a code defined by an arbitrary rule. A BS reads the code to transmit a return message directly to the terminal or transmit a return message intended for the transmitted code.

In the current standard, a terminal uses a code that the terminal randomly selects for itself, not a designated value (i.e., a Service Type IDentifier (STID) of the terminal, and the like), as the transmitted ranging preamble code. Accordingly, in a case where a BS receives the code, the BS cannot know which terminal transmitted the code, so the BS transmits a command signal similar to the terminal that transmitted the code.

In an exemplary embodiment of the present invention, a description is made assuming that a ranging preamble code is rather expressed to be an ID of a terminal defined by an arbitrary rule than expressed to directly designate an ID of a terminal.

In an exemplary embodiment of the present invention, a macro BS transmits ranging channel information (i.e., position information) to pico BSs that are located in a macro cell, thereby previously sharing the ranging channel information of the macro BS with the pico BSs. Based on the ranging channel information, the pico BSs detect a ranging channel code in an uplink channel of the macro cell. The ranging channel information includes a ranging preamble code for a terminal.

At this time, if there is a ranging preamble code detected in the pico BS and a receive power of the ranging preamble code is greater than a predefined value, a macro terminal having transmitted the ranging preamble code can induce interference in the pico BS, so there may be a need for uplink power control for the macro terminal.

The pico BS processes a ranging signal received from a macro terminal, and recognizes a strength and code of the received ranging signal. If a power of the macro terminal having transmitted the code is higher than a predefined value, the pico BS classifies the macro terminal as a terminal inducing interference, and forwards information on the macro terminal or code and power information received in a corresponding frame to the macro BS, thus making a request for power control for the macro terminal through a network.

The macro BS receiving the power control request through the network determines a macro terminal to control power based on a ranging signal received with the same code at the same time, and requests the determined macro terminal to control uplink transmit power.

Figure 3:
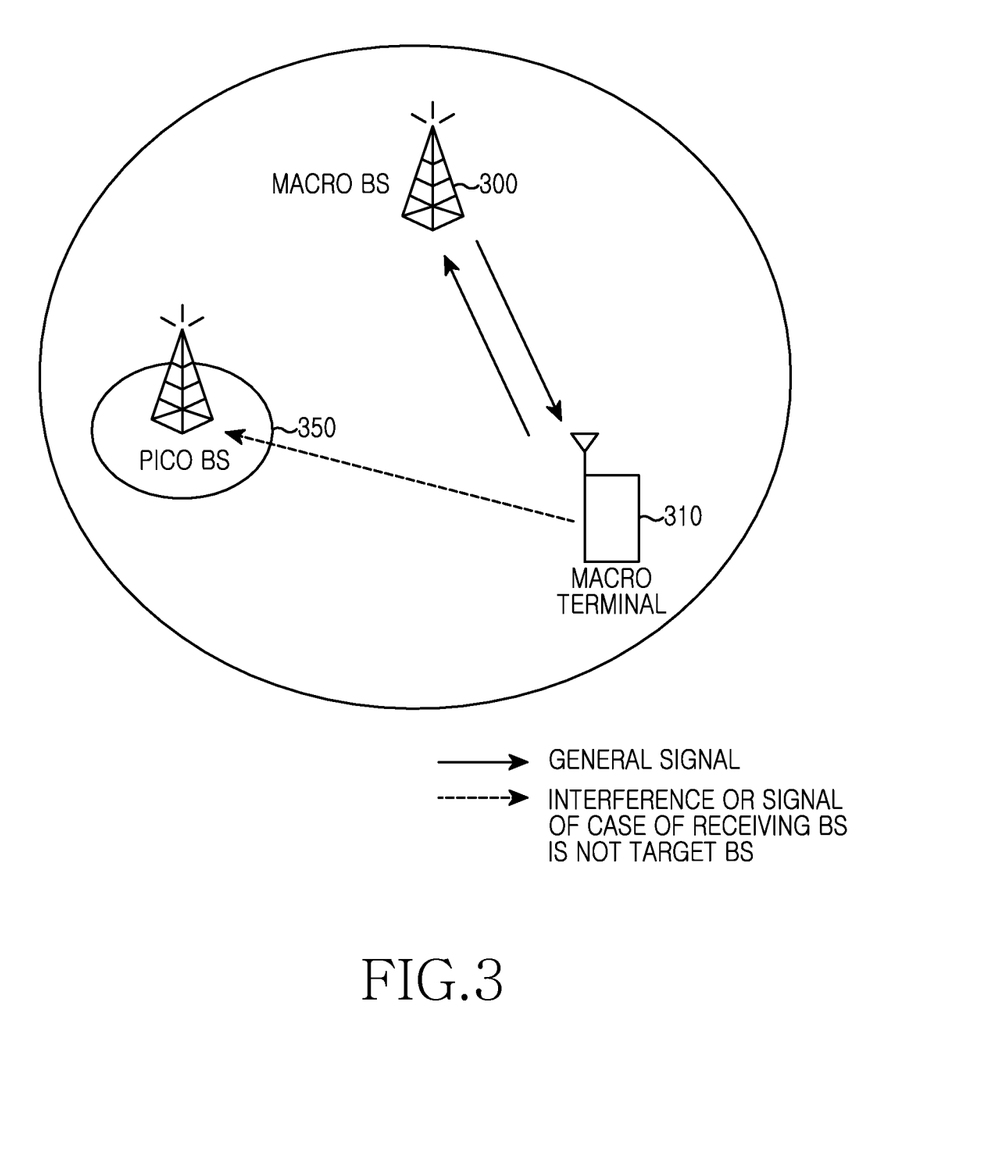
FIG. 3 is a diagram illustrating a forwarding process of a signal among a macro terminal, a pico Base Station (BS), and a macro BS according to an exemplary embodiment of the present invention.

FIG. 3 is a diagram illustrating a forwarding process of a signal among a macro terminal, a pico BS, and a macro BS according to an exemplary embodiment of the present invention.

Referring to FIG. 3, when transmitting an uplink signal to a macro BS 300, a macro terminal 310 increases a transmit power in proportion to a path loss dependent on a distance as in Equation 1 above.

However, because the macro terminal 310 is located in a pico BS 350 relatively closer than the macro BS 300, the pico BS 350 suffers interference from the macro terminal 310.

That is, though the macro terminal 310 transmits a ranging signal to the macro BS 300, the pico BS 350 receives the same ranging signal. In this case, the pico BS 350 can intentionally receive the ranging signal to detect the macro terminal 310 having interference in itself. Accordingly, the pico BS 350 can transmit this information to the macro BS 300, making a request for power control for the macro terminal 310.

Figure 4:
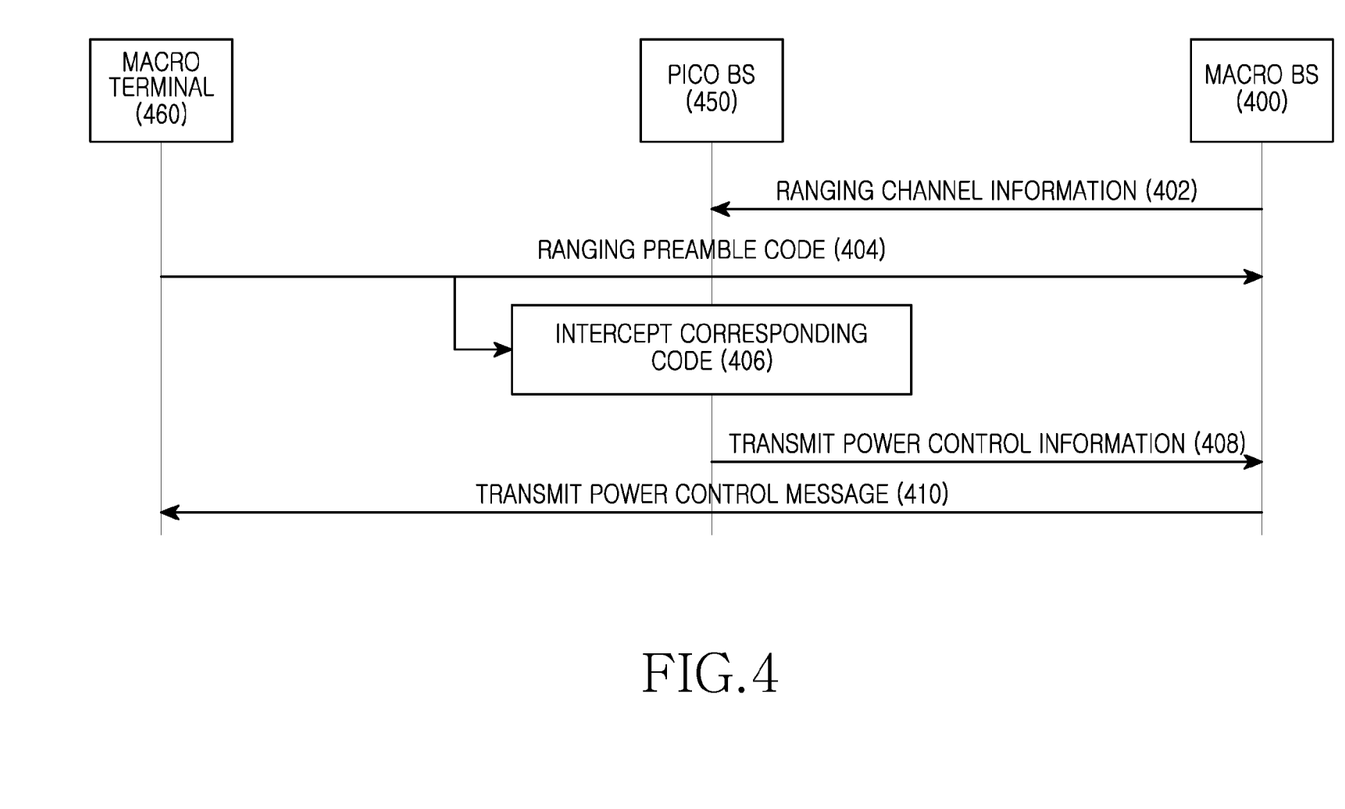
FIG. 4 is a ladder diagram illustrating a forwarding process of a signal among a macro terminal, a pico BS, and a macro BS according to an exemplary embodiment of the present invention.

FIG. 4 is a ladder diagram illustrating a forwarding process of a signal among a macro terminal, a pico BS, and a macro BS according to an exemplary embodiment of the present invention.

Referring to FIG. 4, a macro BS 400 transmits ranging channel information allocated for a macro terminal 460, to a pico BS 450 in step 402.

The macro terminal 460 transmits a ranging signal to the macro BS 400 in a corresponding ranging channel in step 404.

In this case, the pico BS 450 detects the ranging signal of the macro terminal 460 transmitted to the macro BS 400 while listening to the ranging channel, the pico BS 450 decodes the detected ranging signal and determines a strength of a receive power of the ranging signal in step 406.

If the strength of the receive power of the ranging signal is greater than a predefined threshold, the pico BS 450 determines that there is a possibility that the macro terminal 460 will act as an interference source and, based on the decoded ranging signal, the pico BS 450 transmits a corresponding ranging preamble code or the ranging preamble code and a receive power of the ranging preamble code to the macro BS 400 in step 408.

In a case where the macro BS 400 receives the ranging signal of the macro terminal 460 using the ranging preamble code received by the pico BS 450, the macro BS 400 transmits an uplink power control message to the macro terminal 460, reducing a pico cell noise and interference caused by the ranging signal in step 410.

In the above process, although the pico BS 450 receives the ranging channel information for the macro terminal 460 from the macro BS 400, the macro BS 400 may fail to receive the ranging signal from the macro terminal 460, if the macro terminal 460 has set a transmit power. In this case, if the pico BS 450 makes a request for power control to the macro BS 400 but the macro BS 400 fails to receive a ranging signal of a corresponding code, the macro BS 400 disregards the power control request. This is because, owing to a failure of the ranging signal transmission to the macro BS 400, the macro terminal 460 will again transmit a ranging signal to the macro BS 400 and, in absence of this retransmission, the macro terminal 460 is unable to perform data transmission.

When the pico BS 450 forwards the ranging preamble code acting as interference to the macro BS 400 through a network, the ranging preamble code may not be forwarded in real time to the macro BS 400.

In this case, since the ranging preamble code may not directly designate an ID of a macro terminal, there may be a case in which the macro BS 400 fails to accurately determine the macro terminal corresponding to the ranging preamble code.

In this case, there may be a need to notify timing of reception of the ranging preamble code, when the pico BS 450 makes a request for uplink power control to the macro BS 400 according to need.

Equation 2, for open loop power control in a wireless communication system, may include a path L dependent on distance, an NI, a target SINR (SINR$_{Target}$), and other offset value for supplementary power correction. Here, 'P(dBm)' below represents an uplink transmit power.

$$P(\text{dBm}) = L + \text{SINR}_{Target} + \text{NI} + \text{Offset} \qquad (2)$$

More particularly, the communication standard defines a target SINR for a data channel as in Equation 3 below.

$$SINR_{Target} = 10\log_{10}\left(\max\left(10^{\wedge}\left(\frac{SINR_{MIN}(\text{dB})}{10}\right), \gamma_{IoT} \times SIR_{DL} - \alpha\right)\right) - \beta \times 10\log10(TNS) \qquad (3)$$

In Equation 3 above, 'SINR$_{MIN}$', which is a minimum SINR value, represents a value forwarded from a BS to a terminal through a broadcasting channel such that the expected minimum SINR value can be determined in the terminal '$\gamma_{IoT}$', which is a control value for enabling a BS to control the entire uplink noise and interference between terminals within a cell, represents a value forwarded from a BS to a terminal through a broadcasting channel. '$\alpha$' represents a value determined in a BS according to the number of receive antennas. '$\beta$' represents a value determined in a BS according to the number of streams of a transmit signal.

$$P(\text{dBm}) = f(\Delta\text{power}_{pico}) \qquad (4)$$

Equation 4 above defines a formula of transmit power control for a macro terminal having a receive power ($\Delta$power$_{pico}$) as a parameter in a case where a pico BS receives a ranging signal transmitted by the macro terminal. This, for example, is given in Equation 5 below.

$$P(\text{dBm}) = L + \text{SINR}_{Target} + \text{NI} + \text{Offset} - g(\Delta\text{power}_{pico}) \qquad (5)$$

Equation 5 above can be described by a power control formula that a pico BS reflects a function formula g(x) of a receive power ($\Delta$power$_{pico}$) of a ranging signal of a macro terminal additionally in Equation 2 above.

An exemplary method in which the pico BS reflects a function h(x) of a receive power ($\Delta$power$_{pico}$) of a ranging signal of a macro terminal can be expressed as in Equation 6 below.

$$SINR_{Target} = 10\log_{10}\left(\max\left(10^{\wedge}\left(\frac{SINR_{MIN}(\text{dB})}{10}\right), \gamma_{IoT} \times SIR_{DL} - \alpha - h(\Delta power_{pico})\right)\right) - \beta \times 10\log10(TNS) \qquad (6)$$

Here, according to an exemplary embodiment of the present invention, a macro BS can reduce power for a corresponding macro terminal by as much as a predefined level. Alternatively, according to a specific condition, a macro BS can also reduce power for a corresponding macro terminal in proportion to information received from a pico BS.

Through a method in which a pico BS detects a ranging signal of a macro terminal and forwards the ranging signal to a macro BS, the macro BS can more directly control a macro terminal acting as an interference source of a pico BS, thereby improving a transmission/reception performance of the pico BS.

Figure 5:
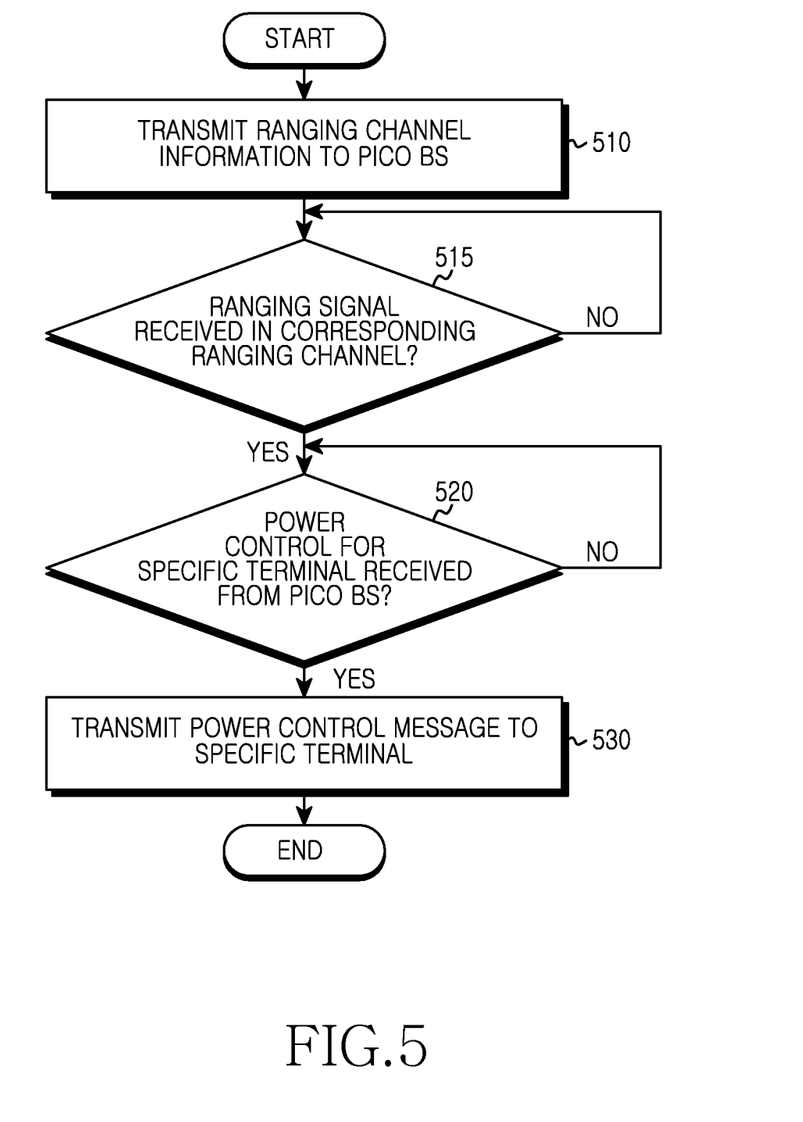
FIG. 5 is a flowchart illustrating an operation process of a macro BS according to an exemplary embodiment of the present invention.

FIG. 5 is a flowchart illustrating an operation process of a macro BS according to an exemplary embodiment of the present invention.

Referring to FIG. 5, a macro BS transmits ranging channel information, allocated for a macro terminal, to a pico BS in step 510.

The macro BS determines if it receives a ranging signal in a corresponding channel from the macro terminal in step 515. If so, the macro BS determines if it receives, from the pico BS, a ranging preamble code or the ranging preamble code and a receive power for the macro terminal about which the pico BS has determined that there is a possibility that the macro terminal will act as an interference source because a strength of the receive power for the macro terminal is greater than a threshold in step 520.

If the macro BS receives the ranging preamble code and the receive power from the pico BS, the macro BS transmits an uplink power control message to the macro terminal, thereby reducing a pico cell noise and interference caused by the ranging signal in step 530.

Figure 6:
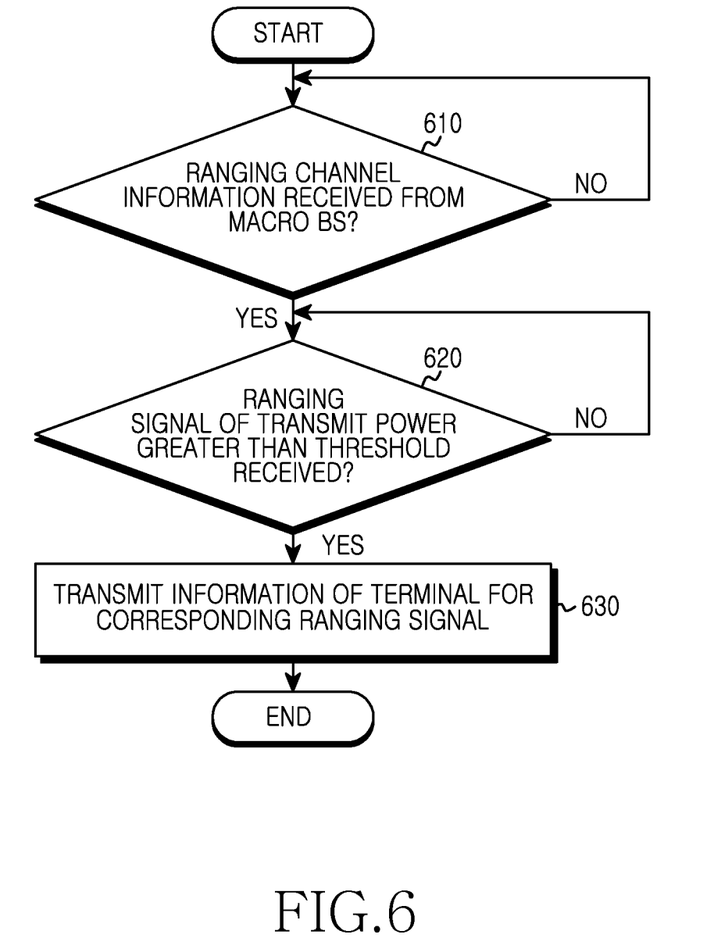
FIG. 6 is a flowchart illustrating an operation process of a pico BS according to an exemplary embodiment of the present invention.

FIG. 6 is a flowchart illustrating an operation process of a pico BS according to an exemplary embodiment of the present invention.

Referring to FIG. 6, a pico BS receives ranging channel information allocated for a macro terminal, from a macro BS in step 610. In a case where the pico BS detects a ranging signal of the macro terminal transmitted to the macro BS, the pico BS decodes the detected ranging signal and determines a strength of a receive power of the ranging signal.

If it is determined that the strength of the receive power is greater than a threshold in step 620, the pico BS determines that there is a possibility that the macro terminal will act as an interference source. Based on the decoded ranging signal, the pico BS transmits a corresponding code or the corresponding code and a receive power of the corresponding code to the macro BS in step 630.

Figure 7:
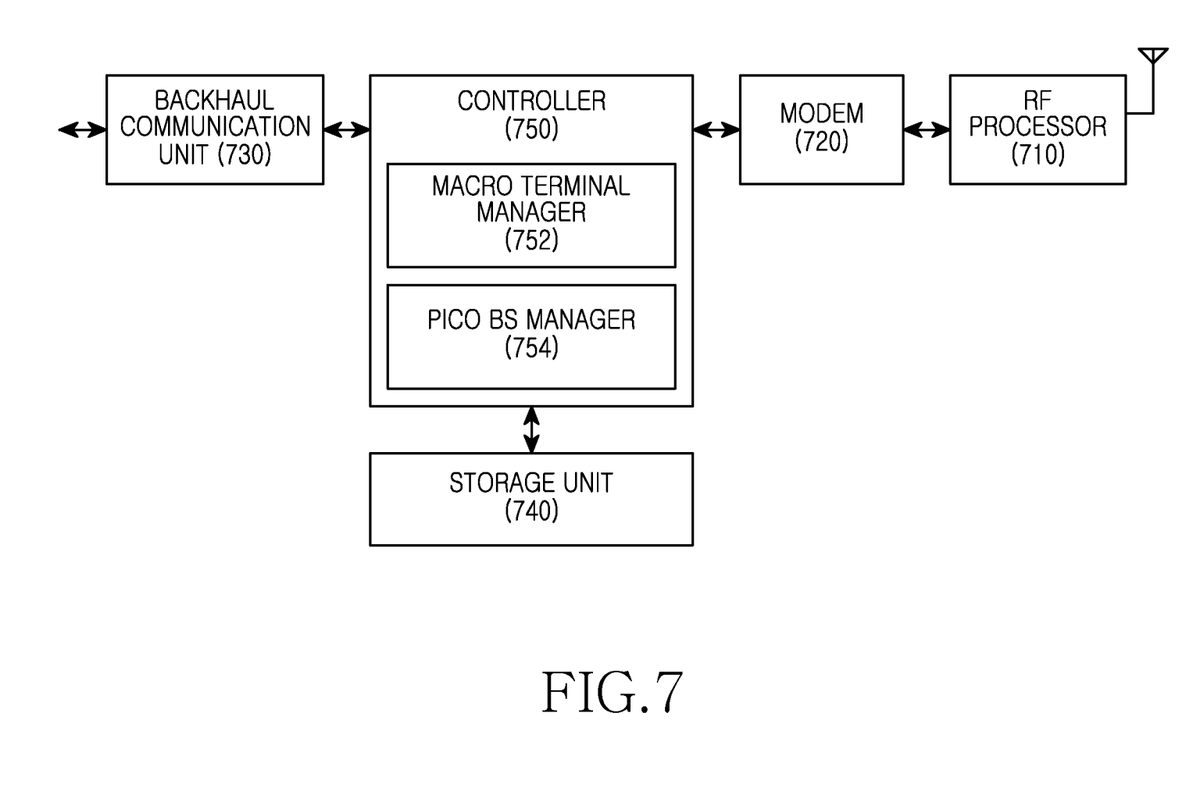
FIG. 7 is a block diagram illustrating a construction of a macro BS or a pico BS according to an exemplary embodiment of the present invention.

FIG. 7 is a block diagram illustrating a construction of a macro BS or a pico BS according to an exemplary embodiment of the present invention.

Referring to FIG. 7, a macro BS or a pico BS includes a Radio Frequency (RF) processor 710, a modulator/demodulator (modem) 720, a backhaul communication unit 730, a storage unit 740, and a controller 750.

The RF processor 710 performs a function of transmitting/receiving a signal through a wireless channel, such as signal band conversion, amplification, and the like. That is, the RF processor 710 upconverts a baseband signal provided from the modem 720 into an RF band signal and transmits the RF band signal through an antenna, and downconverts an RF band signal received through the antenna into a baseband signal.

The modem 720 performs a function of conversion between a baseband signal and a bit stream according to a physical layer standard of a system. For example, at data transmission, the modem 720 encodes and modulates a transmit bit stream, thereby generating complex symbols, and maps the complex symbols to subcarriers, and constructs Orthogonal Frequency Division Multiplexing (OFDM) symbols through Inverse Fast Fourier Transform (IFFT) operation and Cyclic Prefix (CP) insertion. In addition, at data reception, the modem 720 divides a baseband signal provided from the RF processor 710 in an OFDM symbol unit, restores signals mapped to subcarriers through FFT operation, and restores a reception bit stream through demodulation and decoding.

The backhaul communication unit 730 provides an interface for performing communication with an upper system.

The storage unit 740 stores data of a basic program for an operation of the BS, an application program, user contents, and the like, and provides the stored data according to a request of the controller 750.

The controller 750 controls general operations of the macro BS or the pico BS. For instance, the controller 750 constructs and provides downlink data to the modem 720, and analyzes uplink data provided from the modem 720.

In a case of the macro BS, the controller 750 includes a pico BS manager 754. The pico BS manager 754 transmits ranging channel information allocated for a macro terminal, to a pico BS through the backhaul communication unit 730. The pico BS manager 754 determines if it receives a ranging signal in a corresponding ranging channel from a macro terminal, and determines if it receives, from the pico BS, a ranging preamble code or the ranging preamble code and a receive power for a macro terminal about which the pico BS determines that there is a possibility that the macro terminal will act as an interference source because a strength of the receive power of the macro terminal is greater than a predefined threshold. If the macro BS receives the ranging preamble code and the receive power from the pico BS, the pico BS manager 754 transmits an uplink power control message to the macro terminal through the modem 720, reducing a pico cell noise and interference caused by the ranging signal.

In a case of the pico BS, the controller 750 includes a macro terminal manager 752.

The macro terminal manager 752 receives ranging channel information allocated for a macro terminal, from a macro BS through the backhaul communication unit 730. In a case where the macro terminal manager 752 detects a ranging signal of a macro terminal transmitted to the macro BS, the macro terminal manager 752 decodes the detected ranging signal and determines a strength of a receive power of the ranging signal.

If the strength of the receive power of the macro terminal is greater than a predefined threshold, the macro terminal manager 752 determines that there is a possibility that the macro terminal will act as an interference source. Based on the decoded signal, the macro terminal manager 752 transmits a corresponding code or the corresponding code and a receive power of the corresponding code to the macro BS through the backhaul communication unit 730.

Exemplary embodiments of the present invention prevent the transmission performance deterioration of a pico cell or femto cell due to uplink interference of a macro terminal close to the pico cell or femto cell in a wireless communication system including a heterogeneous network. In addition, exemplary embodiments of the present invention minimize interference between heterogeneous BSs in a wireless communication system.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of uplink power control for a terminal in a macro Base Station (BS) of a wireless communication system, the method comprising:
   communicating with a communication system node through a backhaul communication unit;
   transmitting ranging channel information to a pico BS through the backhaul communication unit;
   receiving power control information on a macro terminal from the pico BS;
   based on the power control information, determining a transmit power strength for the macro terminal; and
   instructing the macro terminal to control a transmit power to the determined strength.

2. The method of claim 1, wherein the ranging channel information comprises a ranging preamble code.

3. The method of claim 1, wherein the power control information comprises a ranging preamble code for the macro terminal and a receive power strength of a ranging signal that the pico BS receives from the macro terminal.

4. The method of claim 1, wherein the power control information comprises a ranging preamble code for the macro terminal.

5. The method of claim 1, wherein the controlling of the transmit power is determined through the following Equation:

$$P(dBm) = L + SINR_{Target} + NI + \text{Offset} - g(\Delta \text{power}_{pico}),$$

wherein P is uplink transmit power, L is path Loss value, NI is Noise and Interference, $SINR_{Target}$ is target received Signal to Interference and Noise Ratio (SINR), and $g(\Delta \text{power}_{pico})$ is a function reflecting receive power of a ranging signal of the macro terminal in the pico BS.

6. A method of uplink power control for a terminal in a pico Base Station (BS) of a wireless communication system, the method comprising:
   communicating with a communication system node through a backhaul communication unit;
   receiving ranging channel information from a macro BS;

if detecting a ranging signal that a macro terminal transmits to the macro BS, decoding the detected ranging signal and determining a strength of a receive power of the ranging signal; and if the strength of the receive power is greater than a threshold, determining that there is a possibility that the macro terminal will act as an interference source, and transmitting through the backhaul communication unit power control information on the macro terminal to the macro BS to make a request for power control for the macro terminal.

7. The method of claim 6, wherein the ranging channel information comprises a ranging preamble code.

8. The method of claim 6, wherein the power control information comprises a ranging preamble code for the macro terminal and the strength of the receive power of the ranging signal that the pico BS receives from the macro terminal.

9. The method of claim 6, wherein the power control information comprises a ranging preamble code for the macro terminal.

10. The method of claim 6, wherein the power control for the macro terminal is determined in a macro BS through the following Equation:

$$P(\text{dBm}) = L + \text{SINR}_{Target} + \text{NI} + \text{Offset} - g(\Delta \text{power}_{pico}),$$

wherein P is uplink transmit power, L is path Loss value, NI is Noise and Interference, $\text{SINR}_{Target}$ is target received Signal to Interference and Noise Ratio (SINR), and $g(\Delta \text{power}_{pico})$ is a function reflecting receive power of a ranging signal of the macro terminal in the pico BS.

11. An apparatus of a macro Base Station (BS) for performing uplink power control of a terminal of a wireless communication system, the apparatus comprising:

a backhaul communication unit for communicating with a communication system node;

a modulator/demodulator (modem) for communicating with a terminal; and a controller for transmitting ranging channel information to a pico BS through the backhaul communication unit, for receiving power control information on a macro terminal from the pico BS, for determining a transmit power strength for the macro terminal based on the power control information, and for instructing the macro terminal through the modem to control a transmit power to the controlled strength.

12. The apparatus of claim 11, wherein the ranging channel information comprises a ranging preamble code.

13. The apparatus of claim 11, wherein the power control information comprises a ranging preamble code for the macro terminal and a receive power strength of a ranging signal that the pico BS receives from the macro terminal.

14. The apparatus of claim 11, wherein the power control information comprises a ranging preamble code for the macro terminal.

15. The apparatus of claim 11, wherein the controller controls the transmit power strength for the macro terminal through the following Equation:

$$P(\text{dBm}) = L + \text{SINR}_{Target} + \text{NI} + \text{Offset} - g(\Delta \text{power}_{pico}),$$

wherein P is uplink transmit power, L is path Loss value, NI is Noise and Interference, $\text{SINR}_{Target}$ is target received Signal to Interference and Noise Ratio (SINR), and $g(\Delta \text{power}_{pico})$ is a function reflecting receive power of a ranging signal of the macro terminal in pico BS.

16. An apparatus of a pico Base Station (BS) for performing uplink power control of a terminal of a wireless communication system, the apparatus comprising:

a backhaul communication unit for communicating with a communication system node;

a modulator/demodulator (modem) for communicating with a terminal; and a controller for receiving ranging channel information from a macro BS through the backhaul communication unit, if detecting, through the modem, a ranging signal that a macro terminal transmits to the macro BS, for decoding the detected ranging signal and for determining a strength of a receive power of the ranging signal, and, if the strength of the receive power is greater than a threshold, for determining that there is a possibility that the macro terminal will act as an interference source, and for transmitting, through the backhaul communication unit, power control information on the macro terminal to the macro BS to make a request for power control for the macro terminal.

17. The apparatus of claim 16, wherein the ranging channel information comprises a ranging preamble code.

18. The apparatus of claim 16, wherein the power control information comprises a ranging preamble code for the macro terminal and the strength of the receive power of the ranging signal that the pico BS receives from the macro terminal.

19. The apparatus of claim 16, wherein the power control information comprises a ranging preamble code for the macro terminal.

20. The apparatus of claim 16, wherein the power control for the macro terminal is determined in a macro BS through the following Equation:

$$P(\text{dBm}) = L + \text{SINR}_{Target} + \text{NI} + \text{Offset} - g(\Delta \text{power}_{pico})$$

wherein P is uplink transmit power, L is path Loss value, NI is Noise and Interference, $\text{SINR}_{Target}$ is target received Signal to Interference and Noise Ratio (SINR), and $g(\Delta \text{power}_{pico})$ is a function reflecting receive power of a ranging signal of the macro terminal in pico BS.

* * * * *